Figure 1:
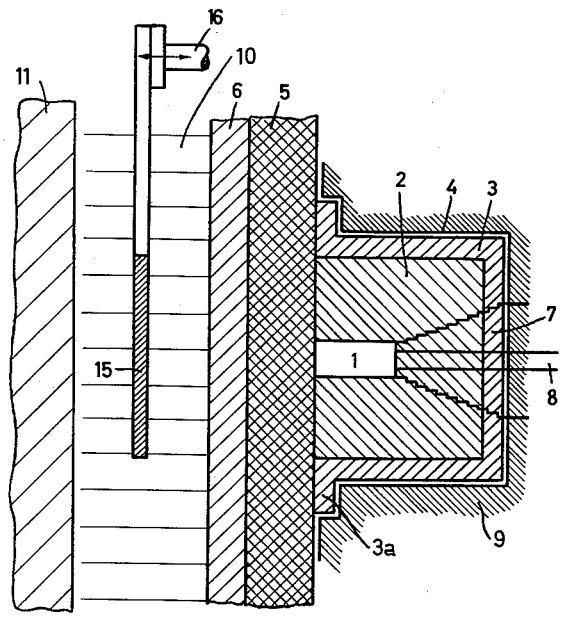

3,050,624
NEUTRON-FLUX GAGE FOR NUCLEAR REACTORS

Karl Janner, Erlangen, Germany, assignor to Siemens-Schuckertwerke Aktiengesellschaft, Berlin-Siemensstadt, Germany, a corporation of Germany
Filed Mar. 13, 1959, Ser. No. 799,202
Claims priority, application Germany Mar. 14, 1958
6 Claims. (Cl. 250—83.1)

My invention relates to neutron-flux measuring gages for use with nuclear reactors and is an improvement over the gages disclosed and claimed in my co-pending application Serial No. 775,405, filed November 21, 1958, and assigned to the assignee of the present invention.

The neutron-flux gages according to the co-pending application comprise a neutron-flux detector or probe, such as an ionization chamber or counter, which is enclosed in a jacket composed of three functionally different layers. One of them consists of moderator substance of great diffusion length such as graphite or beryllium. Another jacket layer consists of reflector substance of smaller diffusion length, such as paraffin or polyethylene. The third layer is a strong neutron absorber and may consist of a coating of boron, for example. Placed in front of the three-layer jacket may be means for increasing the sensitivity and/or the ratio of measuring value to noise level. Such means may consist of a gamma absorber plate, for example of bismuth, which improves the signal-to-noise ratio and is preferably mounted on the outer wall of the nuclear reactor vessel.

The co-pending application further discloses an embodiment of a gage for measuring the total neutron-flux or fast neutrons which requires, for increased sensitivity at the location of the probe, that the reflector be omitted in the reactor vessel or be given a smaller wall thickness at that particular location. As a result of such a local vacancy in the reflector, a stronger neutron-flux can reach the jacketed probe. However, such improvement in sensitivity is obtained at the expense of the neutron economy. While this is not excessively detrimental in some cases, there are others where the reduction in neutron economy is undesirable.

It is an object of my invention, therefore, to devise a jacketed neutron measuring gage generally of the above-mentioned type in which the sensitivity of the probe is greatly improved without incurring the above-mentioned disadvantage.

According to my invention, I provide a neutron measuring gage, aside from a three-layer jacket of the above-described type, with an addition of fissionable material which is located in front of the probe within the reactor vessel and preferably within the reflector zone of the reactor. The fissionable body of material may consist for example of a uranium plate mounted in front of the jacketed probe.

The invention does not require eliminating the above-mentioned reflector-free space in the reactor vessel. In this case, however, this space must contain fissionable material for the purposes of the invention.

The added fissionable material constitutes an additional source of neutrons for the reaction process, and this source produces at the locality of the added material a number of fast neutrons that are nearly proportional to local flux density of the thermal neutrons. This fast neutron flux superimposes itself upon the original flux and improves, on the one hand, the local flux distribution in the reflector zone and, on the other hand, also increases desirably the number of neutrons reaching the measuring probe.

The spacing of the body of fissionable material from the reactor core on the one hand, and the reactor-vessel wall on the other hand, is preferably adjustable at will. Placing the plate of uranium or other fissionable material closer to the measuring probe results in an increase of the additionally produced neutrons, while placing the plate at a greater distance has the effect of reducing the number of additional neutrons. Correspondingly, the neutrons are more strongly or more weakly moderated in the reflector layer between the added fissionable plate and the vessel wall. In the first case, fewer neutrons reach the probe because of increased absorption in the vessel wall. In the second case, more neutrons reach the probe. The neutron-flux at the measuring location of the probe is thus dependent upon the chosen particular locality of the plate.

The invention will be further described with reference to the drawing showing by way of example two different embodiments of the invention.

Figure 2:
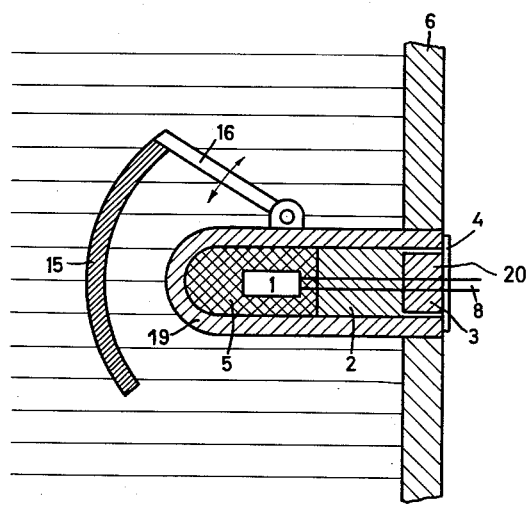

FIG. 1 is a longitudinal section of a neutron-flux gage mounted on a nuclear reactor; and FIG. 2 is a longitudinal section of a flux gage mainly located in the reflector space of a reactor vessel.

In the gage according to FIG. 1, the neutron probe 1 is particularly responsive to slow neutrons. It may consist of any type of detector available for such purpose, such as a boron-lined or $BF_3$-filled ionization chamber or a proportional counter. Such devices, as well as other detectors suitable for the purposes of the present invention, are known as such and described, for instance, in the book "Nuclear Engineering" edited by Charles F. Bonilla, published by McGraw-Hill Book Co., Inc., 1957, New York, chapter IV, pages 102–132. The gage is embedded in three layers 2, 3 and 4 of functionally different character. The inner layer 2 consists of a moderator substance of great diffusion length, for example $D_2O$, carbon such as in form of graphite, or beryllium. The middle layer 3 forms a mounting flange at 3a and consists of reflector substance of small diffusion length in comparison with the above-mentioned moderator substance. The reflector substance of layer 3 may consist of paraffin or polyethylene. Polyethylene is preferable because of its high melting point. The outermost layer 4 consists of a strong neutron absorber and is formed, for example, by a coating of boron.

The detector 1 is directly adjacent to a gamma absorber plate 5 consisting, for example, of bismuth. The fastening means for the detector and its jackets, such as suitable screw bolts, are not illustrated. The absorber plate 5 is adapted to the shape of the reactor vessel and is directly in face-to-face contact with the vessel wall 6 of the reactor. A stopper 7 is placed behind the detector 1 and has channels traversed by the electric connecting leads 8. The stopper 7, being composed of the same materials as the layers 2, 3 and 4, permits exchanging the detector 1.

The direct contact engagement of the detector 1 with the gamma absorber plate 5 is required because the detector is to respond to the entire neutron flux, including the thermal neutrons, emerging through the absorber. For that reason, the reflector layer 3 and the neutron absorber layer 4 are omitted at this particular location where they would be detrimental. The neutrons passing through the wall 6 of the reactor vessel, impinge together with the gamma radiation onto the gamma absorber 5 in which the gamma radiation is weakened as much as is permitted by the admissible amount of concurrent attenuation of the neutron flux. The emerging neutrons penetrate into the space filled by the moderator substance 2 in which any remaining fast neutrons are slowed down to thermal speeds. Due to the great diffusion length of the moderator substance, the neutron detector 1, acting as a neutron sink, also responds to those neutrons that occur in moderator zones relatively remote from the detector.

The reflector substance 3 has the predominant quantitative effect upon the measuring result. If the reflector substance 3 were not present, the moderator substance 2 would have to be given very large dimensions for reasons of neutron economy. Furthermore, when using several neutron detectors in close vicinity to each other, they would be mutually coupled by the neutron flux, and this could render the individual measurements valueless, particularly when removing or adding new detectors. In contrast, not only a considerable reduction in moderator volume, but also an effective de-coupling are obtained by surrounding the moderator layer 2 with the reflector layer 3.

The thickness of the reflector layer 3 can be kept small, depending upon the reflector substance being used and upon the desired percentage of reflectively dispersed neutrons, the fast neutron being additionally subjected to moderation. When using light water as reflector, a layer thickness of 5 cm. suffices for obtaining a reflective dispersion of neutrons of approximately 80%. The remaining 20% are dissipated by absorption in the reflector layer. When using heavy water or carbon as reflector substance, the percentage of reflectively dispersed neutrons rises up to about 95%. In the latter case, however, a reflector layer of five to six times the above-mentioned thickness is required. In the device shown in FIG. 1, for example, the dimensions of the cubic, prismatic or cylindrical jacket of layers may amount to 50 cm. in the horizontal direction and to about 70 cm. in the vertical direction.

The flange portion 3a of reflector 3 has the further purpose of preventing the neutron flux entering into the moderator 2 from being attenuated by the boron absorber 4 at the frontal marginal zone. If the flange portion 3a were omitted, the absorber layer 4 would terminate directly at the gamma absorber plate 5 at a distance of only one reflector thickness from the moderator. Any neutrons penetrating through the reflector 3 are absorbed in the absorber layer 4.

It will be understood that the above-described gage is mounted between the wall of the pressure vessel 6 of the reactor and the biological shield surrounding the reactor and consisting, for example, of suitable concrete. The shield is schematically indicated in FIG. 1 at 9.

The reflector space 10 within the vessel between the reactor core 11 and the vessel wall 6 is filled with suitable reflector substance, for example, $D_2O$. Mounted in the reflector space is a plate 15 of nuclear fuel material such as uranium 235 or enriched uranium. The plate 15 is mounted on a holder rod 16 which can be axially displaced from the outside in order to shift the fissile plate toward or away from the vessel wall 6 to thereby adjust the sensitivity of the gage as explained in the foregoing. In cases where the reflector substance in space 10 is graphite or other solid material, a vacant space may be provided at the location of the fuel plate.

In the embodiment according to FIG. 2, the neutron detector, together with the correspondingly modified jacketing, is mounted within a tube 19, for example of steel and of relatively small wall thickness (shown exaggerated) so as to form a probe that can be inserted from the outside through the vessel wall 6 of the reactor into the particular reactor portion under observation, for example in the vicinity of the reactor core. This results in a quantitative improvement of this measuring operation because the gage is located in a zone of high neutron-flux density. The gamma absorber layer 5 surrounds the detector 1 and fills the closed end portion of the tube 19. Next following toward the outside is the moderator layer 2 and the reflector. The reflector is designed as a stopper 20 and carries the neutron absorber 4. Since the moderator 2 does not surround the detector 1 on all sides, although this can be obtained by giving the immersion tube 19 suitably larger dimensions, the tube 19 must be surrounded on all sides in the interior of the reactor vessel by a moderator substance which, in the illustrated example, is formed by the moderator of the reactor itself. If by virtue of the particular location of the device, the neutron flux already preponderates over the gamma flux, the gamma absorber 5 can be omitted and the space shown occupied thereby in FIG. 2 may be filled by the moderator substance 2. This, of course, is generally applicable and is not limited to the above-described immersion-type device.

An arcuate plate 15 of fissile material is mounted on a pivoted holder 16 in the reflector space of the reactor vessel and can be adjusted from the outside in accordance with the desired sensitivity of the gage, as explained above.

It will be understood by those skilled in the art upon studying this disclosure that neutron-flux gages according to the invention may be modified in various respects, for example in accordance with the embodiments described in the above-mentioned co-pending application, without departing from the essential features of my invention and within the scope of the claims annexed hereto.

I claim:

1. With a nuclear reactor having a reactor core and a vessel enclosing said core, in combination, a gamma-radiation absorber mounted on said vessel, a neutron-flux detector adjacent to said absorber, a shield structure enclosing said detector and comprising three layers, the one of said layers nearest the detector consisting of neutron moderator substance of great diffusion length, a second and intermediate one of said layers consisting of neutron reflective substance of small diffusion length, the outer third layer being a neutron absorber, and a body of fissile substance disposed in said reactor vessel apart from said core at a locality near said detector, said fissile substance serving as an additional neutron generative source between the main neutron source of the reactor and the neutron-flux detector, so as to increase the sensitivity of the latter, the moderator substance slowing down any remaining fast neutrons to thermal neutrons, the reflective substance causing a reflective dispersion of neutrons.

2. With a nuclear reactor having a reactor core, a vessel enclosing said core and enclosing a reflector space between said core and said vessel, in combination, a gamma-radiation absorber mounted on said vessel, an ionization type neutron-flux detector adjacent said absorber, a jacket structure enclosing said detector and comprising three layers, the one of said layers nearest the detector consisting of moderator substance of great diffusion length, a second and intermediate one of said layers consisting of reflective substance of small diffusion length, the outer third layer being a neutron absorber, and a body of fissile substance adjustably mounted in said reflector space near said detector and being displaceable for adjustment toward and away from said core and said detector, said fissile substance serving as an additional neutron generative source between the main neutron source of the reactor and the neutron-flux detector, so as to increase the sensitivity of the latter.

3. A nuclear reactor with neutron-flux gage means as set forth in claim 2, said reflector space having a solid reflector substance therein, said space also having a reflector-free chamber near said detector, said body of fissile substance being displaceably mounted in said chamber.

4. In a nuclear reactor with neutron-flux gage means as set forth in claim 1, said neutron absorber consisting of a plate structure mounted on the outer surface of said vessel, said detector and jacket structure being mounted on the inner side of said absorber plate, and said body of fissile substance being adjustably mounted between said core and the inner side of said vessel, for displacement toward and away from said detector and the inner wall of the vessel.

5. The invention defined in claim 1, the body of fissile substance comprising U 235.

6. The invention defined in claim 2, the body of fissile substance being a relatively smaller body of U 235 than in said reactor core, and being limited to said locality.

References Cited in the file of this patent

UNITED STATES PATENTS

| | | |
|---|---|---|
| 2,462,270 | Lipson | Feb. 22, 1949 |
| 2,525,832 | Sheldon | Oct. 17, 1950 |
| 2,532,874 | Anderson | Dec. 5, 1950 |
| 2,534,932 | Sun | Dec. 19, 1950 |
| 2,556,768 | McKibben | June 12, 1951 |
| 2,608,661 | Zinn | Aug. 26, 1952 |
| 2,845,560 | Curtiss et al. | July 29, 1958 |
| 2,884,529 | Eggler et al. | Apr. 28, 1959 |

FOREIGN PATENTS

| | | |
|---|---|---|
| 1,104,885 | France | June 22, 1955 |